US008360089B2

(12) United States Patent
Hirata

(10) Patent No.: US 8,360,089 B2
(45) Date of Patent: Jan. 29, 2013

(54) FUEL CUT-OFF VALVE

(75) Inventor: Nobuhiro Hirata, Yokohama (JP)

(73) Assignee: Piolax Inc., Yokohama-Shi (JP)

( * ) Notice: Subject to any disclaimer, the term of this patent is extended or adjusted under 35 U.S.C. 154(b) by 283 days.

(21) Appl. No.: 12/816,542

(22) Filed: Jun. 16, 2010

(65) Prior Publication Data

US 2010/0319787 A1 Dec. 23, 2010

(30) Foreign Application Priority Data

Jun. 17, 2009 (JP) ................................ 2009-144142

(51) Int. Cl.
*F16K 24/04* (2006.01)

(52) U.S. Cl. .......................... 137/202; 137/43; 141/198

(58) Field of Classification Search .................... 137/39, 137/43, 202, 587, 398, 409, 165; 141/95, 141/98

See application file for complete search history.

(56) References Cited

U.S. PATENT DOCUMENTS 5,603,349 A * 2/1997 Harris .......................... 137/588
5,809,976 A * 9/1998 Cook et al. .................... 137/202
6,810,900 B2 * 11/2004 Kato ............................ 137/202
7,089,954 B2 * 8/2006 Crawford ...................... 137/202
7,163,023 B2 * 1/2007 Spink et al. ................... 137/202
7,770,594 B2 * 8/2010 Kishi ........................... 137/202
7,900,648 B2 * 3/2011 Rouxel et al. ................. 137/202
8,100,153 B2 * 1/2012 Hirata .......................... 137/202
8,141,576 B2 * 3/2012 Matsuo ......................... 137/202

FOREIGN PATENT DOCUMENTS

JP 2006-097599 A 4/2006

* cited by examiner

*Primary Examiner* — Craig Schneider
*Assistant Examiner* — Craig J Price
(74) *Attorney, Agent, or Firm* — Holtz, Holtz, Goodman & Chick, P.C.

(57) ABSTRACT

Provided is a fuel cut-off valve capable of preventing liquid fuel from flowing into a valve inside from an evaporation line side, and inhibiting the liquid fuel from flowing into a canister side. The fuel cut-off valve includes: a housing main body including a lower space and an upper space partitioned through a partition wall; a float valve coming into contact with/moving away from a first opening; a lid sealing the upper space; an evaporation line connection pipe communicated to the upper space; a canister connection pipe similarly communicated to the upper space; and a second opening formed in a portion coupled to the evaporation line connection pipe and a third opening formed in a portion coupled to the canister connection pipe, which are surrounded by walls formed in the housing main body and/or the lid, and communicated to each other only through the upper space beyond the walls.

4 Claims, 7 Drawing Sheets

FUEL CUT-OFF VALVE

BACKGROUND OF THE INVENTION

1. Field of the Invention

The present invention relates to a fuel cut-off valve that is attached to a fuel tank of an automobile or the like to cause fuel vapor in the fuel tank to escape toward a canister, and inhibits liquid fuel from flowing into the canister.

2. Description of the Related Art

For example, on a fuel tank of an automobile or the like, there is attached a fuel cut-off valve that causes fuel vapor in the fuel tank to escape toward a canister arranged outside the fuel tank, and prevents liquid fuel from discharging to the outside of the fuel tank. The fuel cut-off valve is used not only to prevent outflow of fuel to the outside but also as a fill-up control valve for stopping fuel supply at an upper limit of a fuel supply amount when the fuel is supplied.

Besides a connection pipe that is connected to the canister and is communicated to the outside of the fuel tank, the fuel cut-off valve is sometimes provided with a connection pipe for connecting an evaporation line that couples together other valves such as a pressure control valve and a roll-over valve arranged in the fuel tank.

For example, Japanese Patent Application Laid-open No. 2006-97599 discloses the following fuel cut-off valve. Specifically, the fuel cut-off valve includes a case main body that forms a valve chamber connected to a communication path for communicating the inside of a fuel tank with the outside thereof, a float valve body that is housed in the valve chamber and moves upward and downward while increasing and decreasing a buoyant force with use of fuel in the fuel tank flowing in and out of the valve chamber, to thereby open and close the communication path, fins provided to protrude along an up-down direction of a side wall portion of the float valve body in order to decrease a sliding resistance with respect to an inner peripheral wall surface of a side wall portion of the case main body, a vent hole formed in an upper portion of the side wall portion of the case main body, for ventilating the inside of the fuel tank and the valve chamber.

Further, a case upper portion is fixed by welding to an upper portion of the case main body. On an outer periphery of the case upper portion, a connection pipe communicated to a canister is provided to protrude, and a connection pipe communicated to an evaporation line is provided to protrude. Both of the connection pipes are communicated to each other through an inner periphery of the case upper portion.

In addition, an upper wall portion having a communication hole formed at the center thereof is formed in the upper portion of the case main body. The float valve body floating along with rise of a liquid level of fuel is fitted into the communication hole and closes the communication hole, to thereby inhibit leakage of liquid fuel toward the canister. Further, on an upper surface of the upper wall portion, a rib surrounding the communication hole is provided to protrude from a position with a predetermined gap with respect to the inner periphery of the case upper portion.

In the fuel cut-off valve and a float valve such as a roll-over valve, which are used in the fuel tank, the float valve body closes the communication hole along with the rise of the liquid level of the fuel, to thereby prevent the fuel from leaking to the outside. However, for example, when a vehicle greatly shakes, the fuel sometimes leaks through the communication hole, and leaks into an upper space communicated to the outside.

Therefore, in a case where, besides the connection pipe communicated to the canister, the connection pipe communicated to the evaporation line is coupled to the fuel cut-off valve, the fuel, which enters through the connection pipe on a side of the evaporation line from another valve connected to the evaporation line, sometimes flows into the upper space of the fuel cut-off valve.

In the fuel cut-off valve disclosed in Japanese Patent Application Laid-open No. 2006-97599, the rib surrounding the communication hole is provided on the upper surface of the upper wall portion to protrude from the position with the predetermined gap with respect to the inner periphery of the case upper portion, and hence the fuel leaking through the communication hole of the fuel cut-off valve can be stored within the above-mentioned rib, and can be inhibited from entering the canister.

However, there is a problem in that, when the fuel leaking through another valve enters through the evaporation line, the fuel flows directly into the canister through a space formed outside an outer periphery of the rib. When the liquid fuel flows into the canister, the liquid fuel cannot be handled by the canister, and hence there is a risk in that the fuel flows out to the outside.

SUMMARY OF THE INVENTION

Therefore, it is an object of the present invention to provide a fuel cut-off valve capable of inhibiting the liquid fuel from flowing into piping on the side of the canister even when the liquid fuel flows into the inside of the fuel cut-off valve from piping on the side of the evaporation line.

In order to achieve the above-mentioned object, according to the present invention, there is provided a fuel cut-off valve, including: a housing main body including a lower space and an upper space that are partitioned through a partition wall, the partition wall being provided with a first opening; a float valve that is arranged in the lower space to be movable upward and downward, and comes into contact with the first opening while moving away from the first opening after the contact; a lid that is placed to cover an upper portion of the housing main body, and seals the upper space; an evaporation line connection pipe that is coupled to one of the housing main body and the lid, and is communicated to the upper space; a canister connection pipe that is coupled to one of the housing main body and the lid, and is communicated to the upper space; and a second opening that is provided in a portion coupled to the evaporation line connection pipe and a third opening that is provided in a portion coupled to the canister connection pipe, the second opening and the third opening being surrounded by walls formed in at least one of the housing main body and the lid and being communicated to each other only through the upper space beyond the walls.

In the present invention, it is preferred that the housing main body include one of a rib and a wall surrounding the first opening, and a space surrounded by the one of the rib and the wall serve as a chamber.

In the present invention, it is preferred that the lid include a peripheral wall surrounding an upper peripheral wall of the housing main body, the evaporation line connection pipe and the canister connection pipe be coupled to different positions of the peripheral wall of the lid, respectively, dent portions be respectively provided in portions of the upper peripheral wall of the housing main body corresponding to the second opening, to which the evaporation line connection pipe is coupled, and the third opening, to which the canister connection pipe is coupled, and the second opening and the third opening be, owing to the dent portions, surrounded by the walls formed in the at least one of the housing main body and the lid, and be communicated to each other only through the upper space beyond the walls.

According to the present invention, for example, when fuel for an automobile flows into the lower space of the housing main body and a liquid level of the fuel rises to a predetermined height or more, the float valve rises to close the first opening of the partition wall, and thus it is possible to prevent the fuel from flowing into the upper space through the first opening. Therefore, for example, through applying the fuel cut-off valve to a cutoff valve, a fill-up control valve, or the like of the fuel tank of the automobile, it is possible to prevent the fuel from leaking to the outside of the fuel tank through the canister connection pipe, and to carry out fuel fill-up control when the fuel is supplied.

Further, the second opening for the evaporation line connection pipe and the third opening for the canister connection pipe are surrounded by the walls formed in the housing main body and/or the lid, and are communicated to each other only through the upper space beyond the walls. Thus, the fuel vapor, which flows into the housing main body through the second opening from the evaporation line connection pipe, flows through the upper space and the third opening into the canister connection pipe, and then flows out to the canister. Meanwhile, even if the liquid fuel leaking through another valve or the like is likely to flow into the housing main body from the second opening, the liquid fuel is blocked by the walls, to thereby be inhibited from flowing into the upper space.

As described above, in the fuel cut-off valve, it is possible to reliably send the fuel vapor toward the canister. At the same time, it is possible to inhibit the liquid fuel that cannot be handled by the canister from flowing into the canister, and to effectively prevent the fuel from leaking to the outside of the fuel tank.

DETAILED DESCRIPTION OF THE PREFERRED EMBODIMENTS

In the following, a fuel cut-off valve according to an embodiment of the present invention is described with reference to FIGS. 1 to 4.

Figure 1:
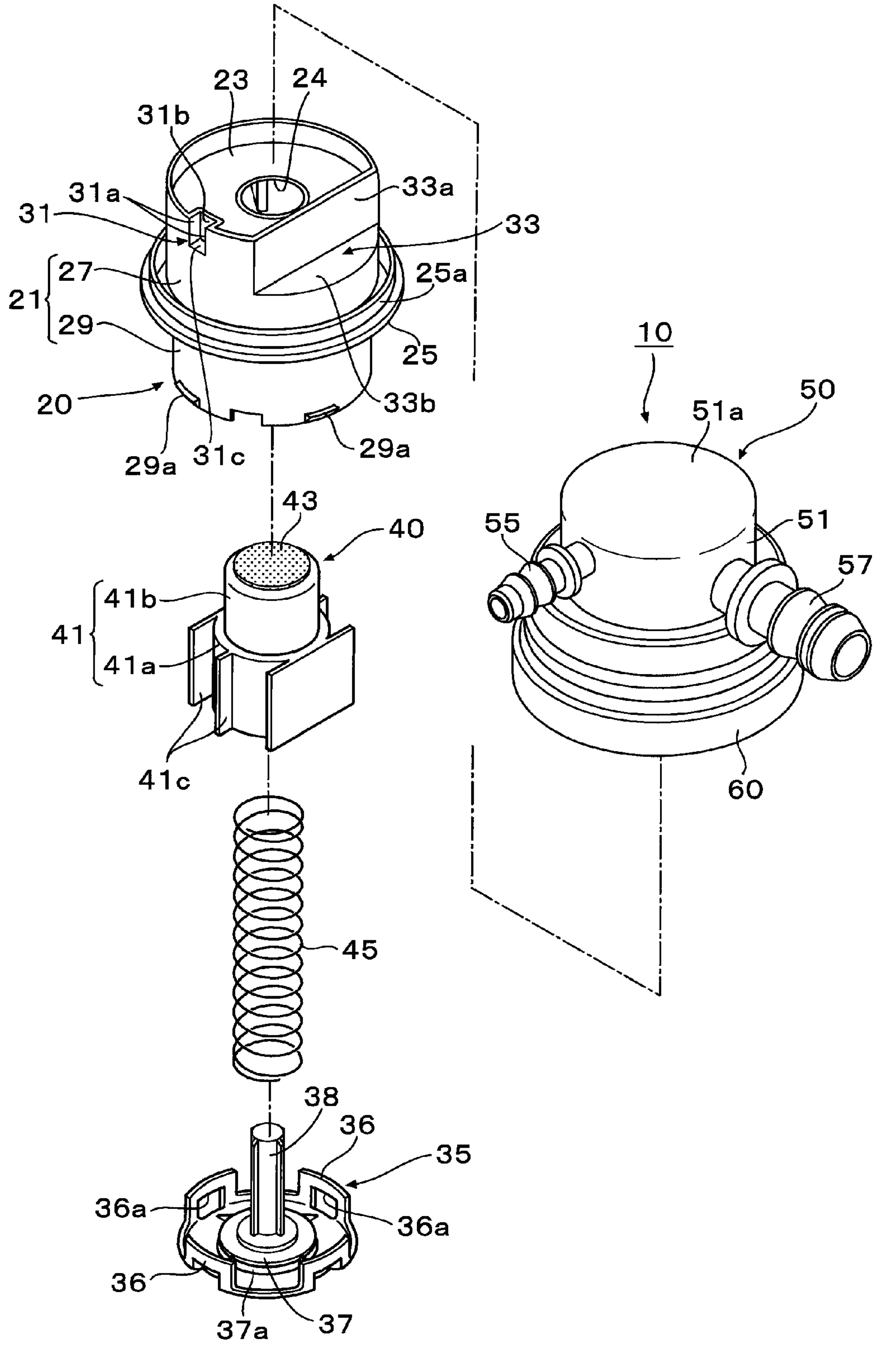
FIG. 1 is an exploded perspective view of a fuel cut-off valve according to an embodiment of the present invention.

As illustrated in FIG. 1, a fuel cut-off valve 10 according to this embodiment mainly includes a housing main body 20 including a bottom lid 35, a float valve 40 housed in the housing main body 20, a lid 50 assembled to an upper portion of the housing main body 20, and an evaporation line connection pipe 55 and a canister connection pipe 57 which are molded integrally with the lid 50.

The lid 50 in this embodiment is placed to cover the upper portion of the housing main body 20, and seals an upper space R2 (see FIG. 2) of the housing main body 20. The lid 50 includes a peripheral wall 51 surrounding an upper peripheral wall 27 of the housing main body 20. An upper portion of the peripheral wall 51 is closed by a head wall **51*a*, whereas a lower portion of the peripheral wall 51** is opened to have a substantially cylindrical shape.

Figure 2:
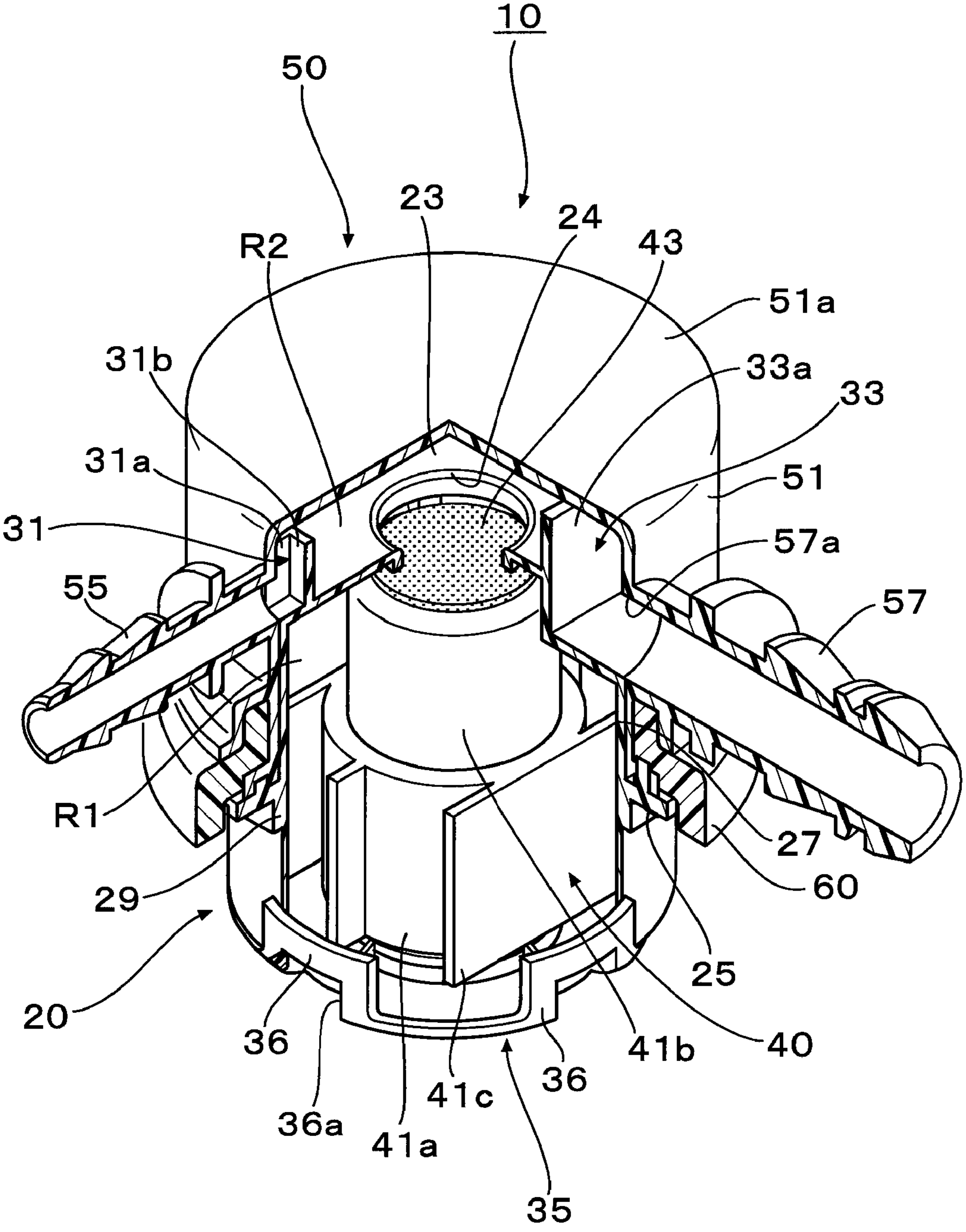
FIG. 2 is a partially broken enlarged perspective view of the fuel cut-off valve.
Figure 3:
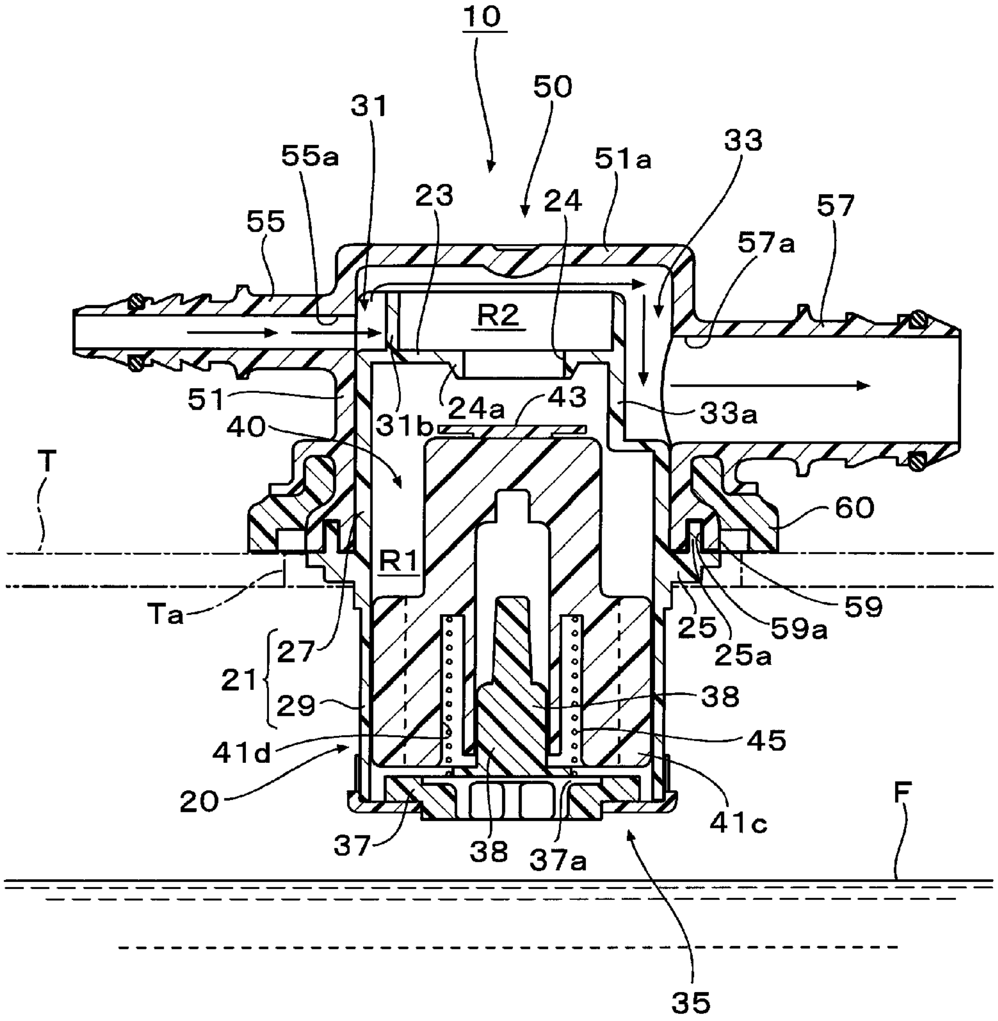
FIG. 3 is a sectional view of the fuel cut-off valve in a state in which a liquid level of the fuel drops and a float valve is lowered.

As illustrated in FIGS. 2 and 3, the evaporation line connection pipe 55 and the canister connection pipe 57 are coupled to an upper outer periphery of the peripheral wall 51. The evaporation line connection pipe 55 is coupled to a roll-over valve, a pressure control valve, or the like (not shown) arranged in a fuel tank T (see FIG. 3), and is connected to piping (piping constituting an evaporation line) through which fuel vapor (gaseous fuel) and the air flow. The canister connection pipe 57 is connected to piping communicated to a canister (not shown) provided outside the fuel tank. In this embodiment, the evaporation line connection pipe 55 and the canister connection pipe 57 are arranged on the peripheral wall 51 of the lid 50 at an interval of about 90 degrees to be orthogonal to each other. A second opening **55*a* and a third opening 57*a* are respectively formed in portions in which the evaporation line connection pipe 55 and the canister connection pipe 57 are coupled to the lid 50. Each of the second opening 55*a* and the third opening 57*a* is communicated to the inside of the lid 50 and the upper space R2 of the housing main body 20**.

As illustrated in FIG. 3, an annular bonding portion 59, which is bonded to a bonding flange 25 of the housing main body 20 to be described below, is provided to protrude on an outer periphery of a lower opening portion of the peripheral wall 51. An annular recess **59*a*, which receives an annular protrusion 25*a* of the bonding flange 25, is provided in a lower peripheral edge of the bonding portion 59**.

In addition, an annular tank attachment member 60 is formed integrally with the lid 50 by insert molding, and is provided on an outer side of the bonding portion 59. The tank attachment member 60 is a member separated from the lid 50, and is made of a synthetic resin, such as polyethylene, which is allowed to be welded to the resin fuel tank T. An outer peripheral edge portion of the tank attachment member 60 projects downward by a predetermined height, and constitutes a portion welded to a front peripheral edge of an opening portion Ta of the fuel tank T (see FIG. 3).

Next, the housing main body 20 is described with reference to FIGS. 1 to 3.

The housing main body 20 includes a substantially cylindrical peripheral wall 21. A lower portion of the peripheral wall 21 is opened, and a partition wall 23 is provided at a position slightly below an upper end of the peripheral wall 21. The housing main body 20 has a structure in which the partition wall 23 defines a lower space R1 and the upper space R2. Further, a circular first opening 24 is formed to pass through the center of the partition wall 23, and the lower space R1 and the upper space R2 are communicated to each other through the first opening 24. In addition, a lower peripheral edge of the first opening 24 is provided to protrude in a cylindrical shape by a predetermined height, and constitutes a valve seat **24*a* with/from which a valve body 43 of the float valve 40** to be described below comes into contact/moves away.

The bonding flange 25 that is bonded to the bonding portion 59 of the lid 50 is provided to protrude in an annular shape radially outward from a predetermined position in a height direction of the peripheral wall 21. The annular protrusion 25*a*, which is to be inserted into the annular recess 59*a* of the bonding portion 59 of the lid 50, is provided to protrude from an upper peripheral edge of the bonding flange 25. An upper portion of the peripheral wall 21 with respect to the bonding flange 25 constitutes the upper peripheral wall 27, whereas a lower portion of the peripheral wall 21 with respect to the bonding flange 25 constitutes a lower peripheral wall 29. On a lower outer periphery of the latter lower peripheral wall 29, a plurality of engagement projections 29*a*, which is to be engaged in engagement holes 36*a* of the bottom lid 35 as described below, are provided to protrude along a peripheral direction of the latter lower peripheral wall 29.

Further, the upper peripheral wall 27 projects upward from an outer periphery of the partition wall 23 by a predetermined length, and a space surrounded by the projecting portion of the upper peripheral wall 27 serves as a chamber for storing liquid fuel leaking from the first opening 24. Note that, in this embodiment, the inside of the projecting portion of the upper peripheral wall 27 serves as the chamber. However, it is possible that another wall or rib surrounding a periphery of the first opening 24 is provided and thus the inside of another wall or rib is used as a chamber.

Further, the upper peripheral wall 27 is formed to have an outer diameter substantially conforming to an inner diameter of the peripheral wall 51 of the lid 50. When the lid 50 is mounted to the housing main body 20, an outer periphery of the upper peripheral wall 27 is substantially brought into close contact with an inner periphery of the peripheral wall 51. Further, a height by which the upper peripheral wall 27 projects above the partition wall 23 is set so that an upper edge of the upper peripheral wall 27 is situated below the head wall 51*a* of the lid 50 when the lid 50 is assembled to the housing main body 20 (see FIG. 3).

In addition, in the upper peripheral wall 27, there are provided a dent portion 31 and a dent portion 33 in a position corresponding to the second opening 55*a* of the evaporation line connection pipe 55 and a position corresponding to the third opening 57*a* of the canister connection pipe 57, respectively.

As illustrated in FIG. 1, the dent portion 31 formed in the position corresponding to the second opening 55*a* includes a pair of side surfaces 31*a* and 31*a* that cross a tangential direction of the upper peripheral wall 27 to extend radially inward, an inner surface 31*b* coupled to end portions on a radially inner side of the side surfaces 31*a* and 31*a*, and a bottom surface 31*c*. The dent portion 31 is opened upward and radially outward, and is dented into a substantially U-shape in top view.

Meanwhile, the dent portion 33 formed in the position corresponding to the third opening 57*a* includes a bottom surface 33*b*, and a cross-sectional surface 33*a* straightly crossing the upper peripheral wall 27. The dent portion 33 is dented into a substantially crescent shape in top view.

Note that, the second opening 55*a* of the evaporation line connection pipe 55 is arranged higher than the third opening 57*a* of the canister connection pipe 57. However, a barrier formed by the projecting portion of the upper peripheral wall 27 has a uniform height.

The dent portions 31 and 33 in this embodiment are provided in the upper peripheral wall 27 at an interval of about 90 degrees to be orthogonal to each other so that the dent portions 31 and 33 correspond to the evaporation line connection pipe 55 and the canister connection pipe 57, respectively. However, it is possible to arbitrarily set the above-mentioned angle depending on arrangement in the tank.

The housing main body 20 and the lid 50 as described above can be assembled as follows. First, the dent portions 31 and 33 formed in the housing main body 20 are respectively aligned with the evaporation line connection pipe 55 and the canister connection pipe 57 that are coupled to the lid 50. At this position, the upper portion of the housing main body 20 is covered with the lid 50, and the upper peripheral wall 27 of the housing main body 20 is inserted into the peripheral wall 51 of the lid 50. At the same time, the annular protrusion 25*a* of the bonding flange 25 of the housing main body 20 is fitted into the annular recess 59*a* of the bonding portion 59 of the lid 50, and then the bonding portion 59 and the bonding flange 25 are welded and bonded to each other by welding means such as ultrasonic welding or high-frequency welding. Accordingly, it is possible to assemble the lid 50 onto the upper portion of the housing main body 20 to seal the upper space R2.

As a result, as illustrated in FIGS. 2 and 3, the outer periphery of the upper peripheral wall 27 of the housing main body 20 is substantially brought into close contact with the inner periphery of the peripheral wall 51 of the lid 50. At this time, on a radially-outward opening portion of each of the dent portions 31 and 33, the peripheral wall 51 of the lid 50 and the second opening 55*a* or the third opening 57*a* formed in the peripheral wall 51 are situated. An upward opening portion of each of the dent portions 31 and 33 is open to the upper space R2.

On the other hand, an outer periphery of the second opening 55*a* of the evaporation line connection pipe 55 is surrounded by the peripheral wall 51 of the lid 50, and a forward opening end of the evaporation line connection pipe 55 is surrounded by the dent portion 31 of the housing main body 20. Similarly, an outer periphery of the third opening 57*a* of the canister connection pipe 57 is surrounded by the peripheral wall 51 of the lid 50, and a forward opening end of the canister connection pipe 57 is surrounded by the dent portion 33. That is, the second opening 55*a* is surrounded by the peripheral wall 51 of the lid 50 and the dent portion 31, and the third opening 57*a* is surrounded by the peripheral wall 51 of the lid 50 and the dent portion 33. The second opening 55*a* and the third opening 57*a* are open only to the upper space R2, and are communicated to each other through the upper space R2 beyond the walls of the dent portions 31 and 33.

The bottom lid 35 that covers a lower opening portion of the housing main body 20 having the above-mentioned structure includes a plurality of tongue pieces 36 provided upright on an outer periphery of a circular plate-like base body. In each of the tongue pieces 36, the engagement hole 36*a* in which the engagement projection 29*a* of the housing main body 20 is engaged is formed. Further, a spring receiving base 37 is placed with a communication hole 37*a* on a center portion in a bottom surface of the bottom lid 35, and a float support pillar 38 is provided upright at the center in an upper surface of the spring receiving base 37.

The float valve 40 to be urged by an urging spring 45 includes a base portion 41 and the valve body 43. The base portion 41 includes a larger diameter portion 41*a* and a smaller diameter portion 41*b* provided continuously on the larger diameter portion 41*a*. The valve body 43 is formed of an elastic sealing member made of rubber, elastic elastomer, or the like, which is attached on a top end surface of the smaller diameter portion 41*b* of the base portion 41. Further, from an outer periphery of the larger diameter portion 41*a* of the base portion 41, a plurality of guide fins 41*c* are extended outward to have a size conforming to that of an inner periphery of the lower space R1 of the housing main body 20.

Further, under a state in which the urging spring 45 is inserted into a recess 41*d* formed in a lower portion of the float valve 40, the float valve 40 is received in the lower space R1 of the housing main body 20, and then the engagement holes 36*a* of the bottom lid 35 are aligned with the engagement projections 29*a* of the housing main body 20, respectively. The bottom lid 35 is pushed toward the lower opening portion of the housing main body 20, and the engagement projections 29*a* are engaged in the engagement holes 36*a*, respectively. As a result, it is possible to fit the bottom lid 35 into the lower portion of the housing main body 20.

At this time, the float support pillar 38 is inserted into the lower center of the float valve 40, the urging spring 45 is interposed between the float valve 40 and the bottom lid 35, and the float valve 40 is received in the lower space R1 to be movable upward and downward. Under a state in which the float valve 40 is not dipped in the fuel, the float valve 40 compresses the urging spring 45 under the own weight, and is placed on the bottom lid 35. Further, the urging spring 45 imparts an upward urging force on the float valve 40 together with a buoyant force generated in the float valve 40 when the fuel rises due to inclining of a vehicle or the like and the float valve 40 is dipped in the fuel.

Next, the operation and effect of the fuel cut-off valve 10 is described.

Figure 4:
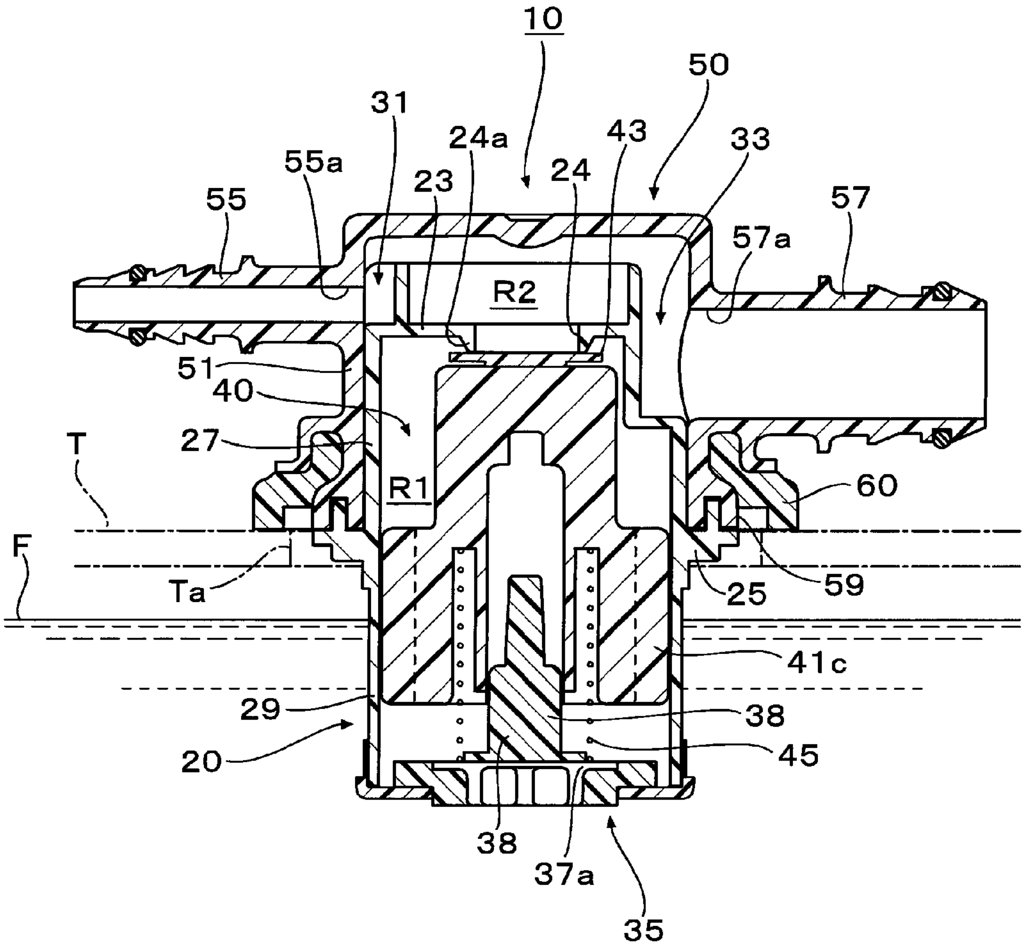
FIG. 4 is a sectional view of the fuel cut-off valve in a state in which the liquid level of the fuel rises and the float valve closes a first opening.

As illustrated in FIGS. 3 and 4, the downward projecting portion of the tank attachment member 60 is welded to a front peripheral edge of the opening portion Ta of the fuel tank T so that the fuel cut-off valve 10 is attached to the fuel tank T. Piping communicated to a valve or the like (not shown) provided inside and outside the fuel tank T is connected to the evaporation line connection pipe 55, and piping communicated to a canister (not shown) provided outside the fuel tank T is connected to the canister connection pipe 57. Further, in the fuel cut-off valve 10, normally, the urging spring 45 is compressed under the weight of the float valve 40, the valve body 43 of the float valve 40 is away from the valve seat 24*a*, and the first opening 24 is open (see FIG. 3). Further, the fuel cut-off valve 10 can be used as a fuel fill-up control valve or a cutoff valve. First, an example in which the fuel cut-off valve 10 is used as the fuel fill-up control valve is described.

That is, when the fuel is supplied into the fuel tank T, the liquid level of the fuel gradually rises, and hence it is necessary to cause the air and the fuel vapor in the fuel tank to flow out to the outside. At this time, the air and the fuel vapor in the fuel tank flow into the lower space R1 of the housing main body 20 from the communication hole 37*a* of the bottom lid 35 (see FIG. 3), and flow into the upper space R2 through the first opening 24. In addition, the air and the fuel vapor flow into the canister connection pipe 57 through the third opening 57*a*, and are sent to the canister provided outside the fuel tank T through the piping (not shown) connected to the canister connection pipe 57.

Therefore, the air and the fuel vapor having a volume corresponding to a volume of the fuel to be supplied are discharged to the outside, and thus fuel supply is progressed. As illustrated in FIG. 4, when the liquid level of fuel F becomes close to the upper limit, the buoyant force is applied onto the float valve 40 due to the fuel flowing into the lower space R1 from the communication hole 37*a*, and thus the float valve 40 is caused to float up in combination with the urging force of the urging spring 45.

When the liquid level of the fuel F reaches the upper limit, the valve body 43 of the float valve 40 comes into contact with the valve seat 24*a* of the first opening 24 to close the first opening 24. As a result, the air and the fuel vapor in the fuel tank are unable to escape therefrom to the outside, and an internal pressure of the fuel tank T is increased. Thus, the fuel supply using a fuel supply gun is automatically stopped by a well-known mechanism. In this way, it is possible to carry out the fuel fill-up control in the fuel supply.

Meanwhile, in a case where the fuel cut-off valve 10 is used as the cutoff valve, the fuel cut-off valve 10 functions as follows. That is, under a state in which a vehicle does not shake and the liquid level of the fuel F in the fuel tank is not inclined, the first opening 24 is open as described above (see FIG. 3). In this state, when the vehicle turns or inclines greatly so that the liquid level of the fuel rises and the float valve 40 is dipped in the fuel F up to a predetermined height or more, the float valve 40 is caused to float up due to the buoyant force and the urging force of the urging spring 45, and comes into contact with the valve seat 24*a* of the first opening 24 to close the first opening 24 (see FIG. 4). Thus, it is possible to inhibit the fuel F from flowing into the upper space R2, and to prevent the fuel from leaking to the outside of the fuel tank T.

To the evaporation line connection pipe 55 of the fuel cut-off valve 10, there is connected piping which is communicated to the valve or the like (not shown) provided inside and outside the fuel tank T, and through which the air and the fuel vapor flow. Thus, the liquid fuel that leaks through another valve or the like (not shown) sometimes flows into the upper space R2 through the second opening 55*a*.

Description is made in this context. As described above, in the fuel cut-off valve 10, the second opening 55*a* of the evaporation line connection pipe 55 is surrounded by the peripheral wall 51 of the lid 50 and the dent portion 31 formed in the housing main body 20, whereas the third opening 57*a* of the canister connection pipe 57 is surrounded by the peripheral wall 51 of the lid 50 and the dent portion 33 formed in the housing main body 20. The second opening 55*a* and the third opening 57*a* are communicated to each other only through the upper space R2 beyond the walls of the dent portions 31 and 33.

Therefore, the air and the fuel vapor flowing into the upper space R2 from the second opening 55*a* of the evaporation line connection pipe 55 flows through the upper space R2 and the third opening 57*a* into the canister connection pipe 57 as indicated by the arrows of FIG. 3, and flows out to the canister.

In contrast, the liquid fuel that leaks through another valve or the like to flow through the second opening 55*a* is blocked by the wall of the dent portion 31 surrounding the second opening 55*a*, and hence the liquid fuel does not flow directly to the third opening 57*a*, and is also inhibited from flowing into the space (chamber) surrounded by the projecting portion of the upper peripheral wall 27. Further, even if the liquid fuel flowing from the second opening 55*a* flows beyond the wall of the dent portion 31 into the space (chamber) surrounded by the projecting portion of the upper peripheral wall 27, the inside of the chamber is surrounded by the projecting portion of the upper peripheral wall 27, and hence no liquid fuel flows into the third opening 57*a*. The liquid fuel flowing into the chamber can be returned into the fuel tank when the first opening 24 is open.

As described above, in the fuel cut-off valve 10, it is possible to reliably send the fuel vapor toward the canister. At the same time, it is possible to inhibit the liquid fuel that cannot be handled by the canister from flowing into the canister, and to effectively prevent the fuel from leaking to the outside of the fuel tank T.

Incidentally, in this embodiment, the periphery of the first opening 24 is surrounded by the projecting portion of the upper peripheral wall 27 and the walls of the dent portions 31 and 33, and the thus surrounded inner space (corresponding to the lower portion of the upper space R2) serves as a chamber for storing the liquid fuel. Owing to provision of the chamber, for example, even if the liquid fuel flows into the chamber beyond the wall of the dent portion 31 surrounding the second opening 55*a*, or even if the liquid fuel flows into the chamber from the first opening 24, it is possible to temporarily store the thus flowing liquid fuel within the chamber, and to return the liquid fuel into the fuel tank T through the first opening 24, the lower space R1, and the communication hole 37*a* when the float valve 40 is lowered to open the first opening 24.

Further, in this embodiment, the lid 50 includes the peripheral wall 51 surrounding the upper peripheral wall 27 of the housing main body 20, and the evaporation line connection pipe 55 and the canister connection pipe 57 are coupled to the peripheral wall 51. The dent portions 31 and 33 are provided in the housing main body 20 correspondingly to the second opening 55*a* of the evaporation line connection pipe 55 and the third opening 57*a* of the canister connection pipe 57, respectively, and hence the second opening 55*a* and the third opening 57*a* are surrounded by the lid 50 and the walls of the housing main body 20. Thus, the second opening 55*a* and the third opening 57*a* are configured to be communicated to each other only through the upper space R2 beyond the walls.

With this configuration, correspondingly to the evaporation line connection pipe 55 and the canister connection pipe 57 provided to different positions of the lid 50, the second opening 55*a* and the third opening 57*a* are provided in different positions of the upper peripheral wall 27 of the housing main body 20, and hence it is possible to reliably provide the two openings 55*a* and 57*a* at separate positions, respectively.

Further, the evaporation line connection pipe 55 and the canister connection pipe 57 are provided on a side of the lid 50, and hence portions (bonding flange 25 and bonding portion 59), in which the housing main body 20 and the lid 50 are bonded to each other by welding, can be provided on a lower side of the fuel cut-off valve 10. As a result, a burr and the like generated when the housing main body 20 and the lid 50 are welded to each other are unlikely to enter the housing main body 20 and the lid 50.

In addition, the evaporation line connection pipe 55 and the canister connection pipe 57 are provided on the side of the lid 50, and hence the housing main body 20 is allowed to have shape degree of freedom. For example, a wall or a rib forming a chamber of the housing main body 20 can be provided to have a large protruding height, or can be formed to have a large width, and hence it is possible to increase a capacity of the chamber.

Figure 5:
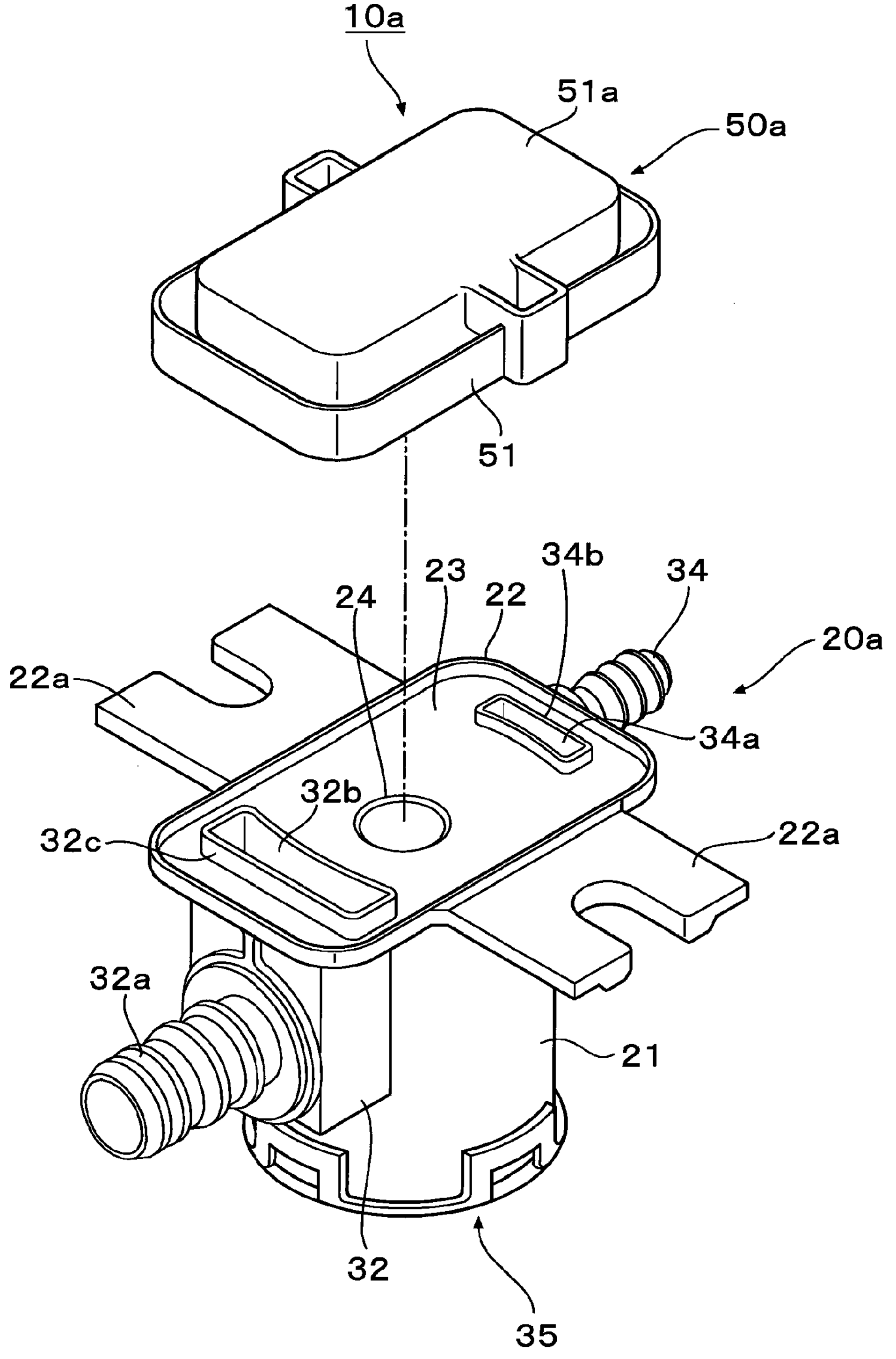
FIG. 5 is an exploded perspective view of a fuel cut-off valve according to another embodiment of the present invention.
Figure 6:
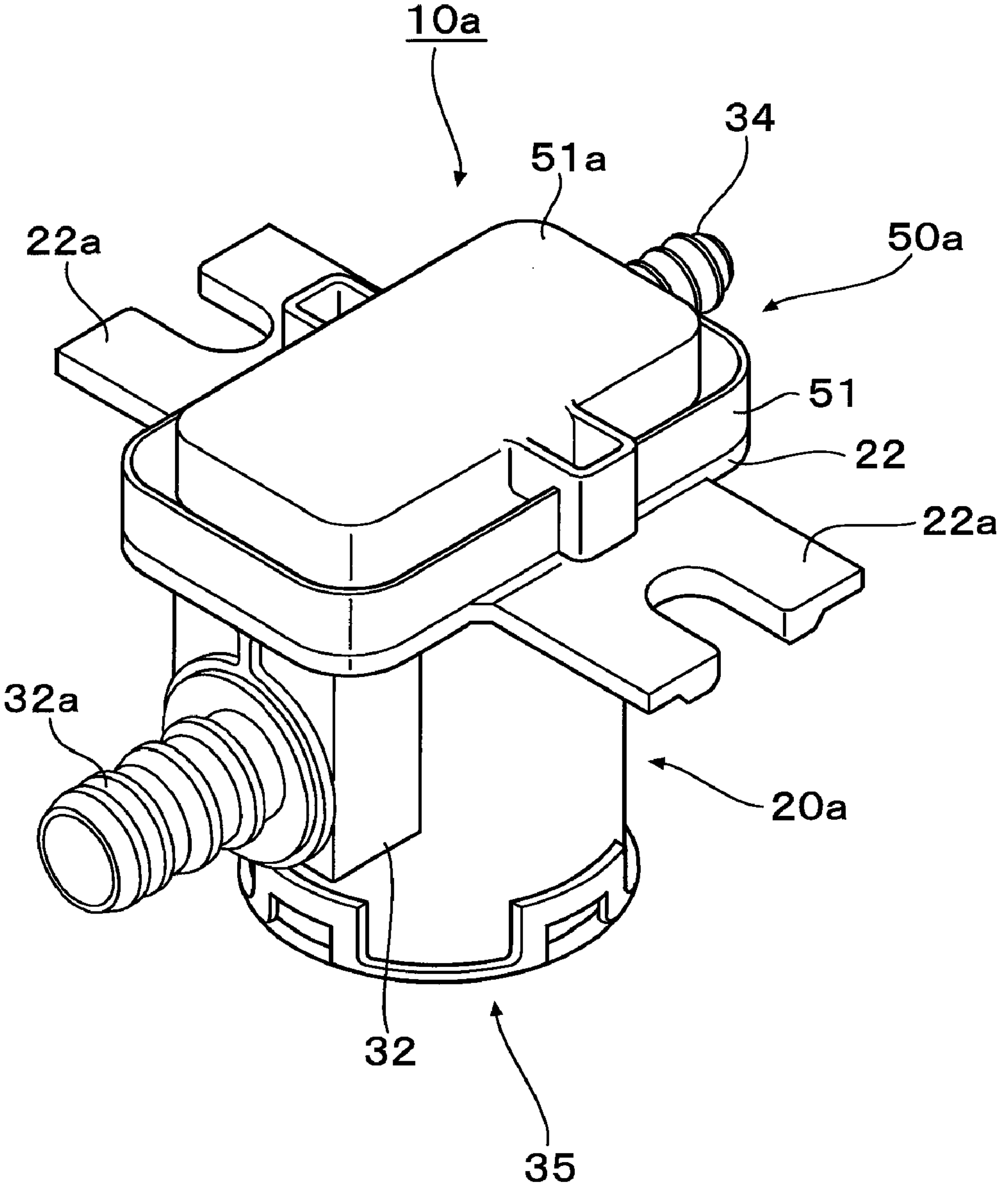
FIG. 6 is a perspective view of the fuel cut-off valve according to another embodiment of the present invention.
Figure 7:
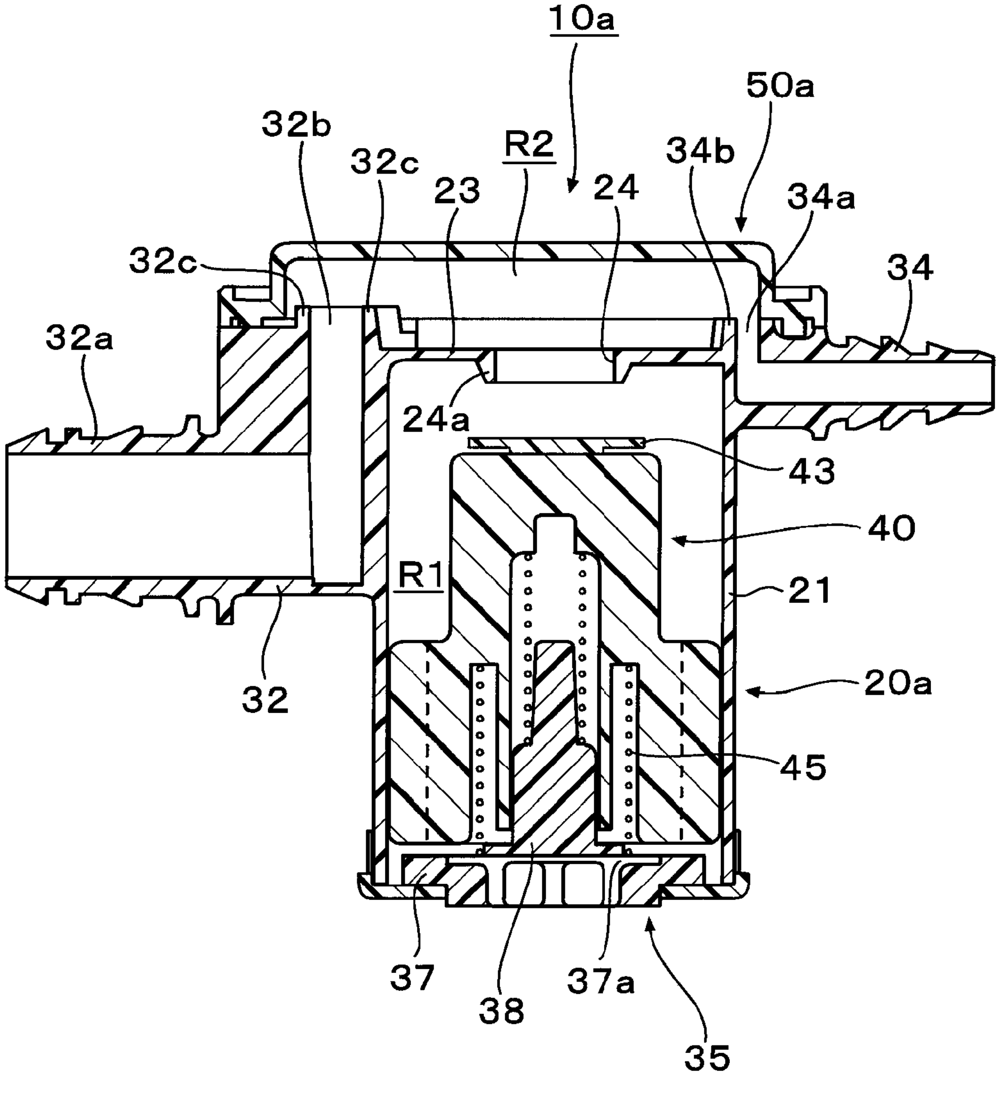
FIG. 7 is a sectional view of the fuel cut-off valve according to another embodiment of the present invention.

FIGS. 5 to 7 illustrate a fuel cut-off valve according to another embodiment of the present invention. Note that, substantially the same portions as those of the above-mentioned embodiment are denoted by the same symbols, and description thereof is omitted.

A fuel cut-off valve 10*a* according to this embodiment includes a housing main body 20*a* and a lid 50*a* that is placed to cover an upper portion of the housing main body 20*a*. The housing main body 20*a* or the lid 50*a* is different from the housing main body 20 or the lid 50 having a substantially circular shape according to the above-mentioned embodiment in that the housing main body 20*a* or the lid 50*a* has a substantially rectangular shape.

In other words, the housing main body 20*a* is provided with the substantially rectangular partition wall 23, and the partition wall 23 defines the lower space R1 and the upper space R2. A square frame-like first rib 22 (constituting a rib in the present invention) is provided upright on an outer peripheral edge of the partition wall 23 to have a height smaller than that of the head wall 51*a* of the lid 50*a*. The first rib 22 surrounds the first opening 24 formed in the center of the partition wall 23.

Further, a box-like pipe connection portion 32 is provided at a predetermined position in the peripheral direction of the peripheral wall 21 of the housing main body 20*a* and on one end side in a longitudinal direction of the rectangular partition wall 23. The pipe connection portion 32 is coupled with a canister connection pipe 32*a*. An inner passage of the canister connection pipe 32*a* extends upward through the inside of the box-like pipe connection portion 32, and is opened as a third opening 32*b* in the upper surface of the partition wall 23. On a peripheral edge of the third opening 32*b*, a frame-like third rib 32*c* (constituting a rib in the present invention) is provided to have a protruding height smaller than the height of the head wall 51*a* of the lid 50*a*.

In addition, an evaporation line connection pipe 34 is coupled at a predetermined position in the peripheral direction of the peripheral wall 21 of the housing main body 20*a* and on the other end side in the longitudinal direction of the rectangular partition wall 23. An inner passage of the evaporation line connection pipe 34 is opened as a second opening 34*a* in the upper surface of the partition wall 23. On an upper peripheral edge of the second opening 34*a*, a frame-like second rib 34*b* (constituting a rib in the present invention) is provided to have a protruding height smaller than the height of the head wall 51*a* of the lid 50*a*.

Meanwhile, the lid 50*a* has a square frame shape, and a lower peripheral edge thereof is welded to an upper end of the first rib 22 of the housing main body 20*a* and is thus assembled to the housing main body 20*a*. Further, the fuel cut-off valve 10*a* is attached in the fuel tank T through plate-like attachment flanges 22*a* and 22*a* provided to protrude from an outer periphery of the first rib 22 of the housing main body 20*a*.

In this embodiment, the following structure is adopted. Specifically, the first opening 24 is surrounded by the square frame-like first rib 22, and the second opening 34*a* and the third opening 32*b* are also surrounded respectively by the second rib 34*b* and the third rib 32*c* provided to protrude upward.

Therefore, the air and the fuel vapor flowing through the evaporation line connection pipe 34 into the second opening 34*a* are allowed to flow through the upper space R2 and the third opening 32*b* into the canister connection pipe 32*a*, to thereby flow out to the canister.

In contrast, in a case where the liquid fuel that leaks through another valve or the like flows into the evaporation line connection pipe 34, the second rib 34*b* surrounding the second opening 34*a* inhibits the liquid fuel from flowing into the upper space R2. Further, even if the liquid fuel that flows into the evaporation line connection pipe 34 flows into the inside of the upper space R2 beyond the second rib 34*b*, the third rib 32*c* is arranged around the third opening 32*b*, and hence the liquid fuel is prevented from flowing into the third opening 32*b*.

What is claimed is:

1. A fuel cut-off valve, comprising:

a housing main body including a lower space and an upper space that are partitioned through a partition wall, the partition wall being provided with a first opening;

a float valve that is arranged in the lower space to be movable upward and downward, and comes into contact with the first opening while moving away from the first opening after the contact;

a lid that is placed to cover an upper portion of the housing main body, and seals the upper space;

an evaporation line connection pipe that is coupled to one of the housing main body and the lid, and is communicated to the upper space;

a canister connection pipe that is coupled to one of the housing main body and the lid, and is communicated to the upper space; and a second opening that is provided in a portion coupled to the evaporation line connection pipe and a third opening that is provided in a portion coupled to the canister connection pipe, the second opening and the third opening being surrounded by walls formed in at least one of the housing main body and the lid and being always communicated to each other only through the upper space beyond the walls.

2. The fuel cut-off valve according to claim 1, wherein:

one of a rib and a wall surrounding the first opening is provided on the partition wall of the housing main body;

a space surrounded by the one of the rib and the wall serves as a chamber;

the one of the rib and the wall is positioned beneath a head wall of the lid; and the chamber is communicated to the upper portion beneath the head wall of the lid.

3. The fuel cut-off valve according to claim 1, wherein:

the lid comprises a peripheral wall surrounding an upper peripheral wall of the housing main body;

the evaporation line connection pipe and the canister connection pipe are coupled to different positions of the peripheral wall of the lid, respectively; said walls surrounding the second opening and the third opening comprise dent portions, which are inwardly dented portions of the upper peripheral wall of the housing main body, and which are respectively opposed to (i) the second opening, to which the evaporation line connection pipe is coupled, and (ii) the third opening, to which the canister connection pipe is coupled; and the second opening and the third opening are each surrounded by a respective dent portion of the upper peripheral wall of the housing main body and the peripheral wall of the lid.

4. The fuel cut-off valve according to claim 2, wherein:

the lid comprises a peripheral wall surrounding an upper peripheral wall of the housing main body;

the evaporation line connection pipe and the canister connection pipe are coupled to different positions of the peripheral wall of the lid, respectively; said walls surrounding the second opening and the third opening comprise dent portions, which are inwardly dented portions of the upper peripheral wall of the housing main body, and which are respectively opposed to (i) the second opening, to which the evaporation line connection pipe is coupled, and (ii) the third opening, to which the canister connection pipe is coupled; and the second opening and the third opening are each surrounded by a respective dent portion of the upper peripheral wall of the housing main body and the peripheral wall of the lid.

* * * * *